(12) United States Patent
Zehner

(10) Patent No.: US 9,087,488 B1
(45) Date of Patent: Jul. 21, 2015

(54) PRODUCING ELECTRO-OPTIC DISPLAY WITH SEAMLESS FRONT SURFACE

(75) Inventor: Robert Zehner, Los Gatos, CA (US)

(73) Assignee: Amazon Technologies, Inc., Reno, NV (US)

( * ) Notice: Subject to any disclaimer, the term of this patent is extended or adjusted under 35 U.S.C. 154(b) by 698 days.

(21) Appl. No.: 13/358,109

(22) Filed: Jan. 25, 2012

Related U.S. Application Data

(60) Provisional application No. 61/535,054, filed on Sep. 15, 2011.

(51) Int. Cl.
| | | |
|---|---|---|
| G09G 3/34 | (2006.01) | |
| G09G 3/20 | (2006.01) | |
| G09F 9/37 | (2006.01) | |

(52) U.S. Cl.
CPC ............. *G09G 3/346* (2013.01); *G09G 3/2022* (2013.01); *G09F 9/372* (2013.01); *G09G 3/344* (2013.01)

(58) Field of Classification Search
CPC ... G09G 3/346; G09G 3/2022; G02B 26/0841
USPC ............... 345/84–87, 102, 107; 359/245, 296
See application file for complete search history.

(56) References Cited

U.S. PATENT DOCUMENTS

| | | | |
|---|---|---|---|
| 6,982,178 B2 * | 1/2006 | LeCain et al. | 438/22 |
| 7,554,712 B2 | 6/2009 | Patry et al. | |
| 7,649,674 B2 | 1/2010 | Danner et al. | |
| 7,667,886 B2 * | 2/2010 | Danner et al. | 359/296 |
| 7,733,554 B2 * | 6/2010 | Danner et al. | 359/245 |
| 7,898,717 B2 * | 3/2011 | Patry et al. | 359/245 |
| 8,363,299 B2 * | 1/2013 | Paolini et al. | 359/245 |
| 8,830,560 B2 * | 9/2014 | Danner et al. | 359/296 |
| 2004/0027327 A1 * | 2/2004 | LeCain et al. | 345/107 |
| 2004/0155857 A1 * | 8/2004 | Duthaler et al. | 345/107 |
| 2007/0153361 A1 * | 7/2007 | Danner et al. | 359/296 |
| 2007/0211002 A1 * | 9/2007 | Zehner et al. | 345/84 |
| 2008/0266244 A1 * | 10/2008 | Bai et al. | 345/107 |

* cited by examiner

*Primary Examiner* — Kimnhung Nguyen
(74) *Attorney, Agent, or Firm* — Lowenstein Sandler LLP

(57) ABSTRACT

Methods and systems for producing an electro-optic display with a barrier layer for a seamless front surface of a user device. The electro-optic display may include a barrier layer, supported by a release film, disposed above a layer of electro-optic medium disposed above a backplane. The barrier layer may have dimensions greater than the electro-optic layer, but less than the backplane. An underfill edge seal is created under the barrier layer and release firm, and the release film is removed. A front-surface material is disposed above the barrier layer. The dimensions of the front-surface material may be greater than or equal to the dimensions of the backplane to create a seamless front surface on the user device.

31 Claims, 13 Drawing Sheets

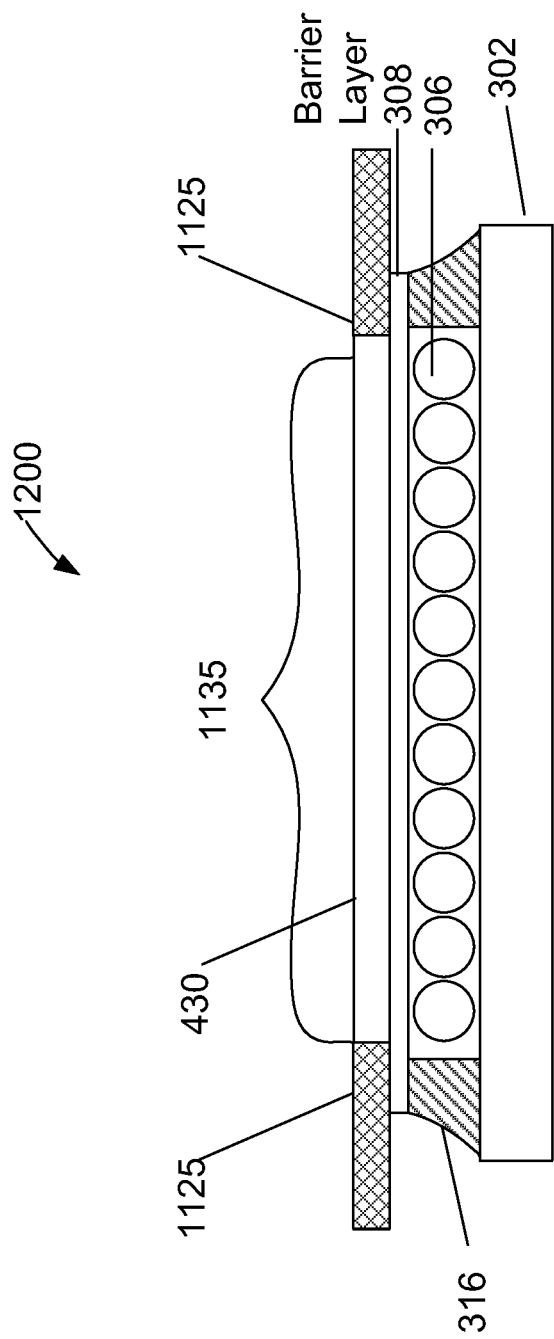

PRODUCING ELECTRO-OPTIC DISPLAY WITH SEAMLESS FRONT SURFACE

RELATED APPLICATIONS

This application claims to the benefit of U.S. Provisional Application No. 61/535,054, filed Sep. 15, 2011, which is hereby incorporated by reference in its entirety.

BACKGROUND OF THE INVENTION

A large and growing population of users enjoys entertainment through the consumption of digital media items, such as music, movies, images, electronic books, and so on. Users employ various electronic devices to consume such media items. Among these electronic devices are electronic book readers, cellular telephones, personal digital assistants (PDAs), portable media players, tablet computers, netbooks, and the like. These electronic devices wirelessly communicate with a communications infrastructure to enable the consumption of the digital media items. Some of these types of electronic devices include an electro-optic display, such as electro-optic displays having encapsulated electrophoretic media. These media typically have internal cavities which contain a fluid (either liquid or gas). Such electro-optic displays may include encapsulated electrophoretic displays, encapsulated liquid crystal displays, and other type of display as described herein.

Electro-optic displays include a layer of electro-optic material, referring to a material configured to operate in first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudocolor in the sense of a change in reflectance of electromagnetic wavelengths outside the visible range. For example, bistable, multi-stable types of displays may be used.

Electrophoretic displays (EPD), however, are sensitive to moisture (both ingress and egress) and ultraviolet (UV) light. Conventional EPDs utilize a top-hat protective layer with an 'underfill' edge seal to form a moisture barrier. FIG. 1 illustrates a conventional EPD 100 with an underfill edge seal 126. The conventional EPD 100 includes the following layers: a backplane 106, a layer of electro-optic medium 110, a conductive layer 14, a substrate 12, and a protective layer 112. The layer of electro-optic medium 110 is a material configured to operate in first and second display states differing in at least one optical property, the material being changed from its first to its second display state by application of an electric field to the material. Although the optical property is typically color perceptible to the human eye, it may be another optical property, such as optical transmission, reflectance, luminescence, or pseudo-color. The electro-optic medium 110 may be encapsulated electrophoretic, encapsulated liquid crystal displays, and other types of electro-optic displays as would be appreciated by one of ordinary skill in the art having the benefit of this disclosure. The electro-optic medium 110 may include multiple microcapsules, each of which includes a capsule wall containing a hydrocarbon-based liquid in which negatively-charged white particles and positively-charged black particles are suspended. Upon application of an electrical field across the medium 110, the white particles move to positive electrode and the black particles move to the negative electrode to display either white or black on the display. In particular, the backplane 106 has at least one pixel electrode, such that application of an electrical potential between the conductive layer 14 and the pixel electrode can change the optical state of the electro-optic medium 110. The backplane 106 includes at least one contact pad electrically isolated from the pixel electrode, and the conductive layer 14 is electrically connected to the contact pad through a conductive via extending from the conductive layer 14 through or past the electro-optic medium 110 to the contact pad. The substrate 12 is a light transmissive substrate, such as a transparent plastic film, such as Polyethylene terephthalate (PET) film, sometimes written poly(ethylene terephthalate). The substrate 12 carriers a thin light-transmissive electrically-conductive layer 14 (e.g., indium tin oxide (ITO)), which acts as the front electrode in the final display. The protective layer 112 may be a protective film laminated over the front plane laminate in the same lamination operation by which the front plane laminate is laminated to the backplane 106. Such a protective film can protect the electro-optic medium against ingress of moisture, other liquids, and some gases. The protective layer 112 absorbs ultra-violet radiation, and the protection layer 112 (and other barrier layers) can be used prevent ingress of oxygen or moisture into the final display and provide anti-reflection coatings to improve the optical properties of the final display.

In the depicted display 100, the protective layer 112 extends beyond the periphery of the electro-optic medium, and a sealing material 126 is placed around at least part of the periphery of the electro-optic medium between the backplane 106 and the conductive layer 14, substrate 12, and protective layer 112. The protective layer 112, substrate 12 and the conductive layer 14 are all larger than the layer of electro-optic medium 110 by a distance of about 0.5 to 1.5 mm. The overhang of the protective layer 112, substrate 12 and conductive layer 14 may be provided by sizing the layer of electro-optic medium 110 to have a smaller surface area than the other layers, or by removing a peripheral portion of the layer of electro-optic medium 110 from around the periphery of the display prior to the lamination of the layers to the backplane 106. Also, prior to lamination, sealing material is dispensed around the periphery of the display so that when the layers are laminated to the backplane 106, the edge seal 126 is formed. Alternatively, the sealing material may be applied after lamination by using capillary forces or direct pressure to fill the sealant into the small cavity around the electro-optic medium 110.

As described above, the protective layer 112 can protect the electro-optic medium against ingress of moisture, other liquids, and some gases. However, even with such a protective layer 112, the edge of the electro-optic medium 110 is still exposed to the environment. For this, the display 100 includes the edge seal 126, which serves to prevent the ingress of moisture and other contaminants around the outer edges of the display. The underfill edge seal is typically a curable sealant material that is applied around the outside edge of the protective layer 112, and wicks beneath it to form a moisture barrier. However, this wicking process generally only works reliably over a short distance, for example, 1-2 mm, limiting the degree of overhang of the protective layer 112 over the edge of the electro-optic medium 110.

FIG. 2 illustrates a conventional double adhesive seal electro-optic display 200 with an additional front protective layer 218. The display 200 includes a backplane 202, a lamination adhesive layer 204, a layer 206 of electro-optic material, a second lamination adhesive layer 220, and a front substrate 208. The electro-optic layer 206 is sandwiched between a backplane 202 and a protective layer 218 and a sealing material extends between the backplane 202 and the protective layer 218. The electric-optic display 200 also includes another adhesive layer 228 between the protective layer 218 and the front substrate 208. The protective layer 218 is a top-hat protective layer 218 that extends beyond an edge of the other layers (208, 220, 206, 204). The dimensions of the top-hat protective layer 218 are less than the backplane 202 to allow the sealing material to be disposed between the protective layer 218 and the backplane 202. For example, the top-hat protective layer 218 may be 1-2 mm less than the backplane 202. The protective layer 218 is secured to the backplane 202 or to a second protective layer adjacent the backplane 202. The electro-optic layer 206 can also be sealed between two layers of adhesive or between one layer of adhesive and the backplane 202. The display 200 also includes a bead of sealing material that extends from the backplane 202 to the rear surface of the protective layer 218, thus forming an underfill edge seal 216. The display 200 utilizes the top-hat protective layer 218 with the 'underfill' edge seal 216 to form a moisture barrier. The underfill edge seal 216 can be formed by dispensing around the periphery sealing material and being laminating to the backplane 202. Alternatively, the sealing material may be applied after lamination by using capillary forces or direct pressure to fill the sealant into the small cavity around the electro-optic medium 206.

While it is potentially possible to attach a larger cover sheet to the top of the existing protective layer (112, 218), there are several reasons not to take this approach. First, the protective layer (112, 218) is a costly multi-layer stack, which adds several dollars to the cost of the assembly. Second, the protective layer (112, 218) is unnecessarily thick, which would increase the z-height of the finished display and thus of the device. Most device developers generally aspire to make their devices as thin as possible to match consumer expectations. Finally, the protective layer (112, 128) both absorbs and scatters light, decreasing the brightness and contrast of the display.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

FIG. 12 illustrates an elevation view of the user device of FIG. 11.

DETAILED DESCRIPTION OF THE PRESENT INVENTION

Figure 1:
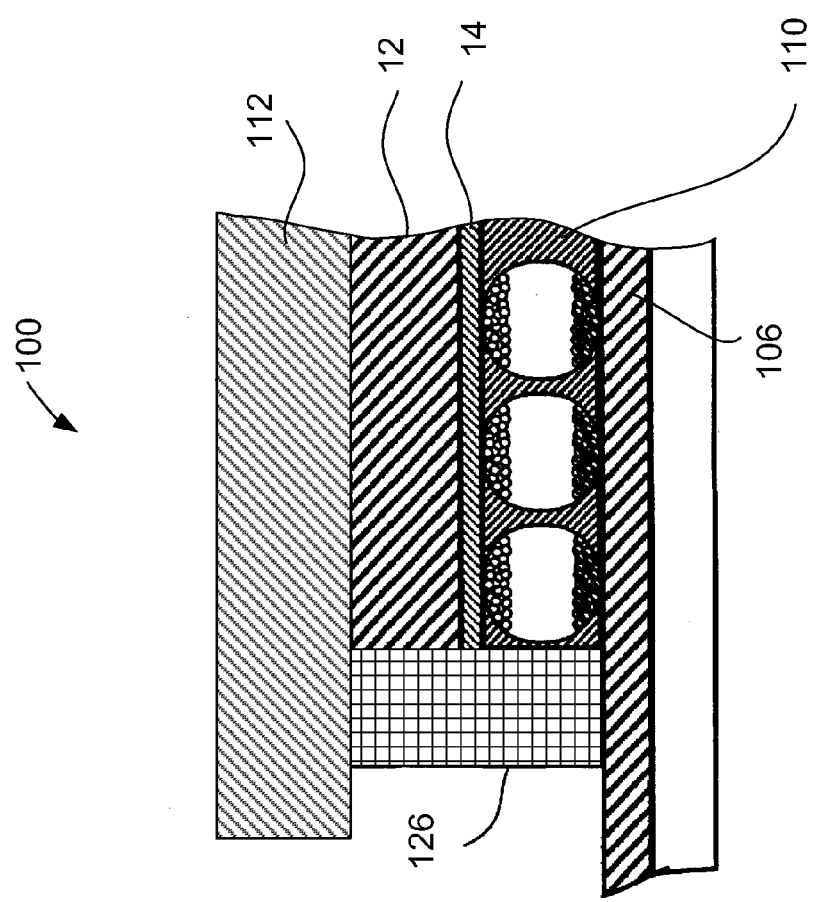
FIG. 1 illustrates a conventional EPD with an underfill edge seal.

Methods and systems for producing an electrophoretic display with a seamless front surface are described.

Conventional EPD displays, such as described in U.S. Pat. No. 7,649,674, and U.S. Pat. No. 6,982,178, assigned to E Ink Corporation of Cambridge, Mass. (hereinafter the '674 patent), include a thin layer of ITO on PET, in which the PET serves as a barrier material, but in practice suffers from pinholes and cracks, through which moisture and other contaminants can penetrate to the electro-optic medium. To increase the sealing properties of the PET/ITO front substrate, a second barrier layer is laminated on the front substrate. This redundant barrier layer is formed of homopolymer, for example, polychlorotrifluoroethylene, available from Honeywell Corporation under the Registered Trademark ACLAR®. The redundant barrier layer may also be formed of a sputtered ceramic, for example, $AlO_x$, available from Toppan Printing Company under the trade name Toppan GX Film. Toppan GX film is characterized by being substantially optically transparent, and by having a Water Vapor Transmission Rate (WVTR) of 0.05 g/m2/day, measured at 50 degrees Celsius and 100% relative humidity (non-condensing), or less. The redundant barrier layer is thin to provide a flexible display, ideally about 12 μm micron, but could be as thick as 5 mil (127 μm) if still sufficiently flexible.

Alternatively, the barrier properties of a PET/ITO or similar front substrate may be improved by coating a redundant metal oxide layer (for example, an alumina layer) either on the opposed surface of the front substrate from the ITO layer or underneath the ITO layer. The combination of the ITO layer and the redundant metal oxide layer improves the barrier properties of the front substrate (for example by reducing migration of water vapor through the inevitable cracks and pinholes in the ITO layer) without undue yellowing of the substrate, such as would occur one attempted to improve barrier properties by increasing the thickness of the ITO layer. Instead of a simple metal oxide layer, a more complex structure containing a ceramic material, such as Barix (Registered Trade Mark) sealing material, available from Vitex Systems, Inc., of San Jose, Calif., could be used; again the barrier layer could be provided on the surface of the front substrate remote from the ITO layer or beneath the ITO layer. Vitex Systems currently sells a polymer film bearing both Barix and ITO layers under the trade name FlexGlass 200, but the polymeric film is 5 mil (127 μm) PEN.

The barrier properties of the front substrate, as well as properties such as flexibility, cost and other specialized properties, may also be controlled by careful choice of both the polymer and conductive material used in the front substrate. Almost any flexible, light-transmissive polymer may in principle be used; suitable polymers include PET, PEN, polycarbonate, poly(vinylidene chloride) (e.g., SARAN®), polychlorotrifluoroethylene (e.g., ACLAR® and CLARIS®, triacetyl cellulose (e.g., ARTON® by JSR Company, polyethersulfone (PES), and laminates of two or more of these materials. Suitable transparent conductive materials include ITO, organic conductive polymers such as Baytron P®, carbon nanotubes, and other suitably conducting light transmissive conductors (transmission greater than 60 percent) having resistivities of less an about $10^4$ ohms/square.

Figure 3:
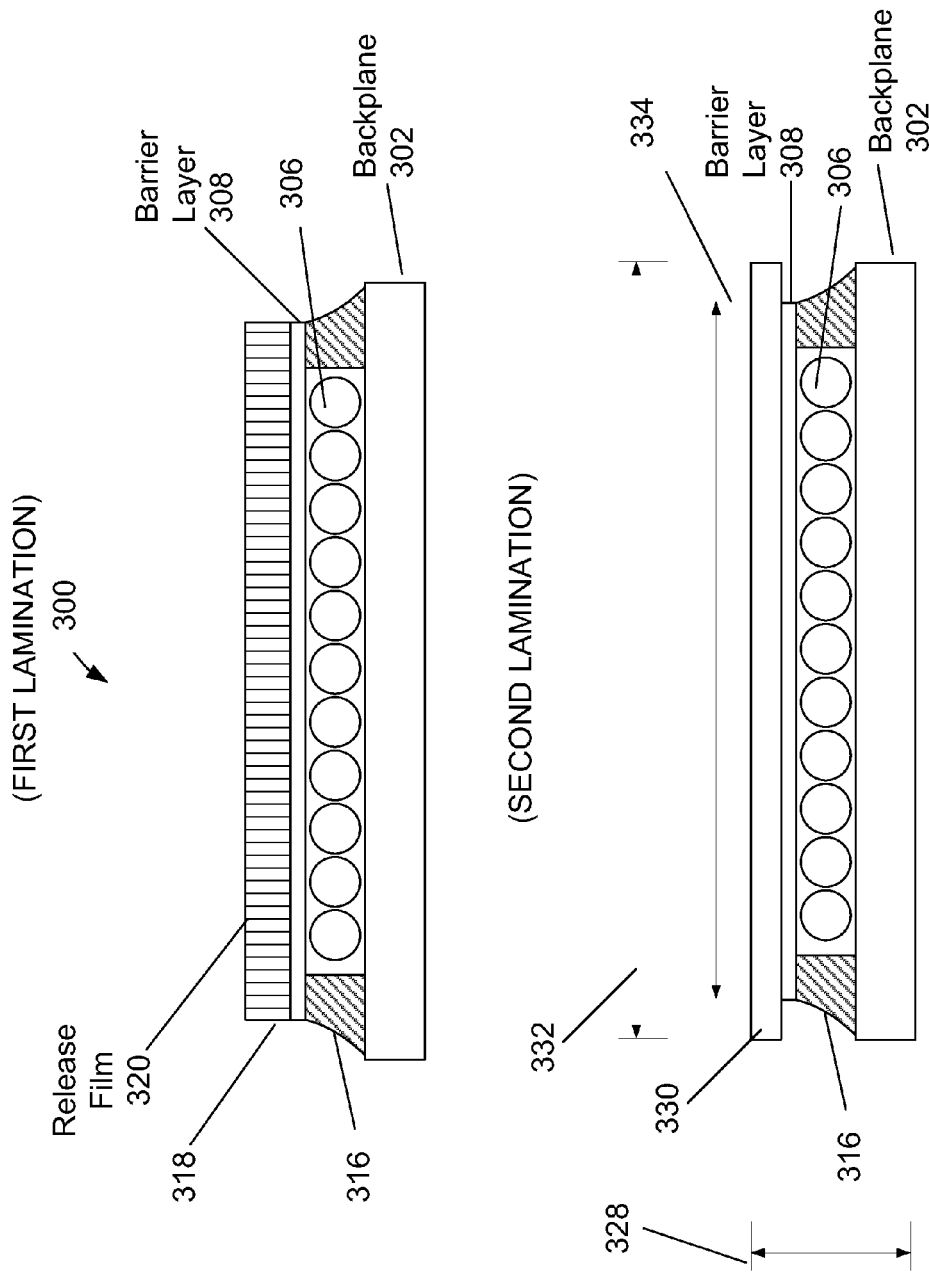
FIG. 3 illustrates a first and a second lamination of an electro-optic display with a barrier layer for a seamless front surface of a user device according to one embodiment.

In place of the protective layer 112 and the top-hat protective layer 218 and the redundant barrier, the embodiments described herein utilize a barrier layer (e.g., Toppan GX film), supported by a release film (e.g., illustrated as barrier layer 308 and release film 320 in FIG. 3). In one embodiment, the layer of Toppan GX film, supported by a release film (e.g., 100 microns or more), is laminated to the front surface of the electro-optic display (e.g., electrophoretic display) after front plane laminate (FPL) lamination, in place of the top-hat protective layer. It should be noted that it is common for the EPD film vendor to supply a top optically clear adhesive to conduct this lamination. For example, E Ink Corporation provides a film that includes an ITO layer above the electrophoretic display material, the PET layer above the ITO layer, and a top adhesive layer above the PET layer. This barrier layer and release film may be substantially the same shape and size as a standard protective layer, such as the top-hat protective layer described above.

An edge seal may be applied to the panel, creating an underfill edge seal between the backplane (e.g., glass) and the Toppan GX film. After creating the underfill edge seal between the backplane and the Toppan GX film, the release film can be removed and another adhesive layer can be added above the Toppan GX film. Then a large glass cover that extends to the edges of the backplane or beyond, for example, can be laminated above the display. This top cover glass could be screen printed with graphics or a border to mask the active area. Alternatively, other front-surface materials may be used.

In another embodiment, the barrier layer may have an optically clear adhesive layer pre-applied to the one surface. This may remove the additional step of adding the additional adhesive layer above the barrier layer (e.g., Toppan GX film). One example of a suitable adhesive would be 3M 8142KCL. After lamination of the Toppan GX film to the display, and completion of the edge sealing process, the release film could be removed to expose this top adhesive, which could then be used to laminate the cover glass that extends to the edges of the backplane or beyond.

FIG. 3 illustrates a first and a second lamination of an electro-optic display 300 with a barrier layer 308 for a seamless front surface of a user device according to one embodiment. The electro-optic display 300 includes a backplane 302, a front plane laminate (FPL) 306, a barrier layer 308, a release film 320, and a front-surface layer 330. The FPL 306 represents the main display component layers and not all the layers of the FPL 306 are illustrated in FIG. 3. For example, the FPL 306 may include an electro-optic medium (e.g., multiple microcapsules), a conductive layer (e.g., ITO), and a barrier layer (e.g., PET). The FPL 306 may be component layers of an EPD. Alternatively, the FPL 306 may include other component layers of other types of displays as would be appreciated by one of ordinary skill in the art having the benefit of this disclosure. The electro-optic medium of the FPL 306 is a material having first and second display state states differing in at leas one optical property, the material being changed from its first to its second display state by application of an electric field to the material. Although the optical property is typically color perceptible to the human eye, it may be another optical property, such as optical transmission, reflectance, luminescence, or pseudo-color. The electro-optic medium may be encapsulated electrophoretic, encapsulated liquid crystal displays, and other types of electro-optic displays as would be appreciated by one of ordinary skill in the art having the benefit of this disclosure. In one embodiment, the electro-optic medium includes multiple microcapsules, each of which includes a capsule wall containing a hydrocarbon-based liquid in which negatively-charged white particles and positively-charged black particles are suspended. Upon application of an electrical field across the electro-optic medium, the white particles move to positive electrode and the black particles move to the negative electrode to display either white or black on the display. The backplane 302 has at least one pixel electrode, such that application of an electrical potential between a conductive layer (not illustrated in FIG. 3) and the pixel electrode can change the optical state of the electro-optic medium.

Figure 2:
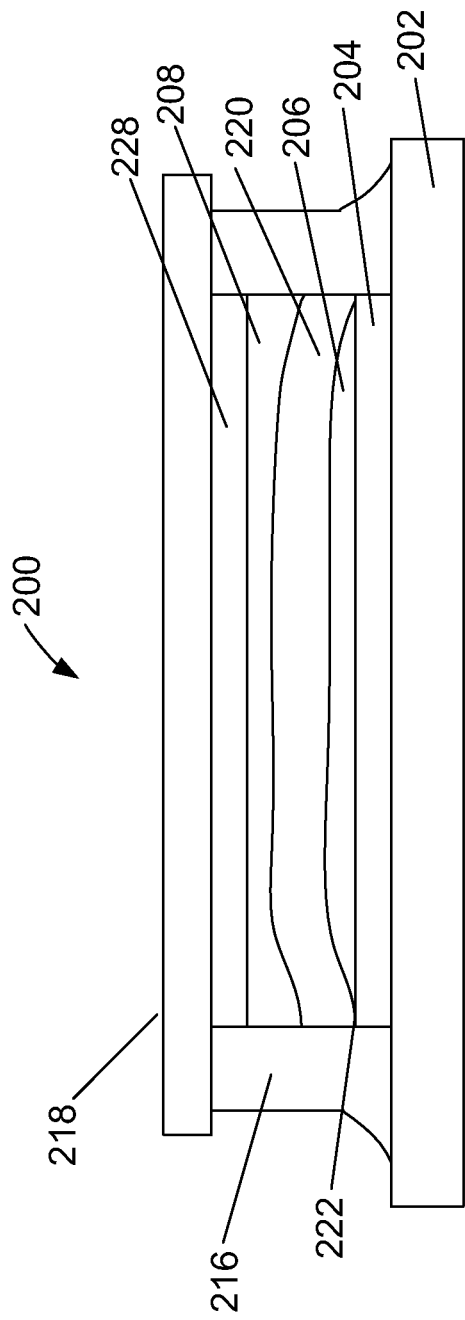
FIG. 2 illustrates a conventional double adhesive seal electro-optic display with an additional front protective layer.

Unlike the conventional EPD displays that laminate a top-hat protective layer (218 of FIG. 2) on top of the FPL, the barrier layer 308, supported by the release film 320 is laminated to the FPL 306 and the backplane 302. Although barrier layer 308 is illustrated as a single layer in FIG. 3, it is typically formed from a barrier material applied to a film substrate. For ease of application to display 300, barrier layer 308 may be provided with release film 320. The first lamination disposes a barrier layer 308 supported by a release film 320 above the FPL 306 disposed above a backplane 302. In one embodiment, in place of the top-hat protective layer, the barrier layer 308 and supporting release film 320 are laminated to the front surface of the FPL 306 (e.g., electrophoretic display) after FPL lamination. It should be noted that prior to the first lamination, the layers of the FPL 306 can be laminated to the backplane 302 (referred to herein as FPL lamination). Alternatively, the layers of the FPL 306 can be laminated when the barrier layer 308 is laminated to the backplane 302. The first lamination is not to be interpreted as being the very first lamination during the manufacturing of the display 300. Rather, first lamination is used to differentiate it from the second lamination of the front-surface layer 330 to the barrier layer 308. It should be noted that it is common practice for the EPD film (e.g., FPL 306) vendor to supply a top optically clear adhesive to conduct the first lamination. The barrier layer 308 would be substantially the same shape and size as a standard protective layer, such as the top-hat protective layer 218 described above.

An edge seal 316 would be applied to the panel as usual, creating an underfill edge seal between the backplane 302 (e.g., glass) and the barrier layer 308 (e.g., Toppan GX film). An edge seal may be applied to the panel, creating an underfill edge seal between the backplane (e.g., glass) and the Toppan GX film. In one embodiment, the edge seal may be sealing material, such as ECCOSEAL™ 7100™ or ECCOSEAL™ 7200™ display sealants, available from Emerson and Cuming. Alternatively, other sealing material may be used. In one embodiment of a process for underfilling, a capillary flow underfill process may be used in which a liquid underfill material such as epoxy resin is dispensed between the barrier layer 308 and the backplane 302. After dispensing the underfill material, the underfill material is cured. Typically, the liquid underfill material can be dispensed using a syringe. The syringe may have a needle size of an inner diameter of 0.33 mm, and thus, can fit between the distance between the end of the barrier layer 308 and the backplane 302. In other words, the barrier layer 308 may be 0.5 mm to 1.0 mm smaller in dimension than the backplane 302 to allow for clearance of the needle of the syringe. When a predetermined amount of underfill material is dispensed along one or more peripheral sides of the backplane 302, the underfill material is drawn inward by capillary action occurring in the gap between the barrier layer 308, layer 306, and the backplane 302. The underfill material dispensed as described above is subsequently cured. Alternatively, the edge seal 316 can be created using other techniques as would be appreciated by one of ordinary skill in the art having the benefit of this disclosure.

After creating the underfill edge seal 316 between the backplane 302 and the barrier layer 308, the release film 320 can be removed. In one embodiment, another adhesive layer can be added above the barrier layer 308 after the release film 320 has been removed. For example, the adhesive layer could be liquid that, when dispensed, is thermally or optically cured (also referred to as Liquid Optically Clear Adhesive (LOCA). However, LOCA can be dispensed after the sheet is laminated in place, for example, just before final assembly. The adhesive layer is used to laminate the front-surface layer 330 to the barrier layer 308. In another embodiment, the barrier layer 308 may have a substantially optically clear adhesive layer pre-applied to the one surface. This may remove the additional step of adding the additional adhesive layer above the barrier layer 308 after removing the release film 320. In one embodiment, the adhesive is 3M 8142KCL. Alternatively, other materials may be used as would be appreciated by one of ordinary skill in the art having the benefit of this disclosure. The front-surface layer 330 may be material that is disposed above the barrier layer 308 after the release film 320 has been removed. For example, a large glass cover can be used as the front-surface layer 330, the glass cover extending to the edges of the backplane 302 or beyond. The glass cover can be laminated above the other layers of the display 300. This glass cover could be screen printed with graphics or a border to mask the active area as would be appreciated by one of ordinary skill in the art having the benefit of this disclosure.

Electro-optic display 300 has a thickness 328. Because the barrier layer 308 is used to create the underfill edge seal 316, the overall thickness 328 is less than that of the conventional EPD displays. As described above, conventional EPD displays use the top-hat protective layer 218 and various other layers to protect the display from moisture, oxygen, and UV radiation and to provide anti-reflection coatings to improve the optical properties of the final display. Instead of using a thick conventional protective layer 218 to create the underfill edge seal, the underfill edge seal 316 is created using the barrier layer 308, which has a smaller thickness (e.g., 12 μm micron) than the conventional protective layer 218, reducing the overall thickness 328 of the display 300. Also, by using the release film 320 to support the barrier layer 308 during the creation of the edge seal 316 and then removing the release film 320, the glass cover (or other front-surface layer 330), can extend to the width 332 of the backplane 302 (illustrated in FIG. 3) or beyond, such as illustrated in FIG. 4.

Figure 4:
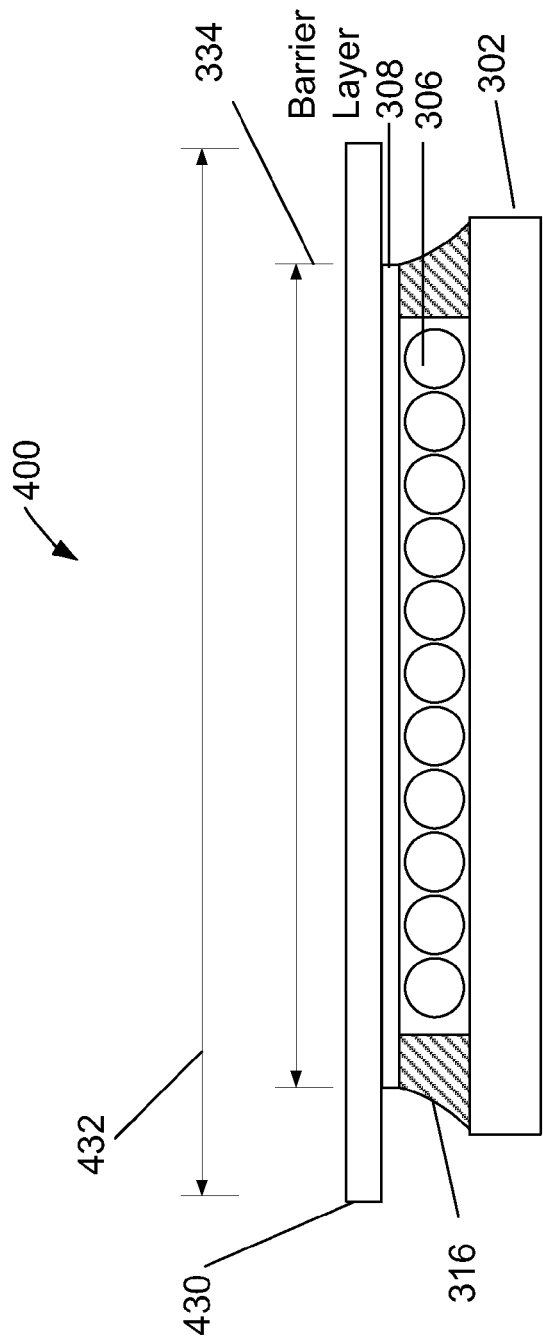
FIG. 4 illustrates an electro-optic display with a front-surface substrate that extends beyond a backplane in width for a seamless front surface of a user device according to one embodiment.

FIG. 4 illustrates an electro-optic display with a front-surface substrate 420 that extends beyond the backplane 302 in width for a seamless front surface of a user device according to one embodiment. The electro-optic display 400 is similar to the electro-optic display 300 as noted by similar reference numbers, except the front-surface layer 430 has a width that is greater than the width of the backplane 302. This allows for a seamless front surface of the user device.

Referring back to FIG. 3, the width 334 of the barrier layer 308 is greater than the width of the FPL 306, but less than the width of the backplane 302, which in the depicted embodiment is the same as the width 332 of the front-surface layer 330. These dimensions allow the necessary clearance for creating the edge seal 316 on the periphery of the FPL 306, but permit the front-surface layer 330 to extend to the size of the backplane 302 or beyond. It should be noted that although the dimensions have been described in terms of width, one of ordinary skill in the art would appreciate that other dimensions can be used to describe that the barrier layer 308 is larger than the FPL 306, and smaller than the backplane 302, and that the front-surface layer 330 is greater than the barrier layer 308 and can be greater than, equal to, or less than the size of the backplane 302.

Figure 5:
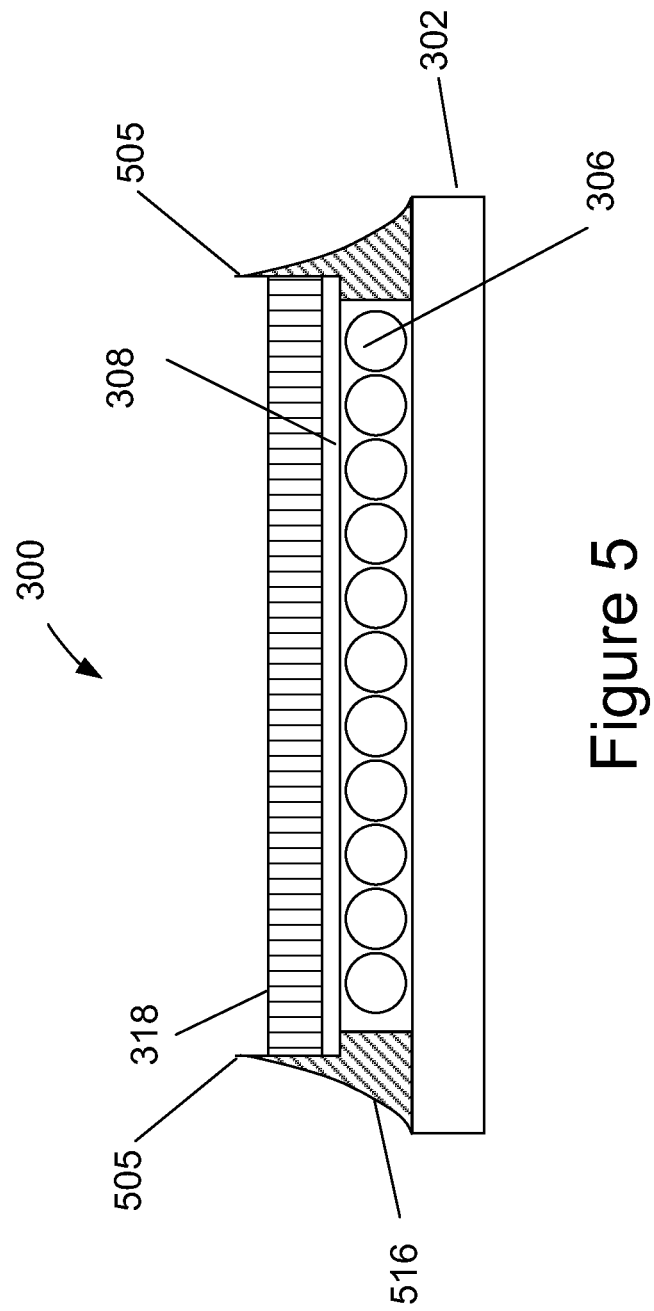
FIG. 5 illustrates the edge seal material climbing the edge of the barrier layer.

One additional problem that is observed in assembly of EPD's is that the dispensed edge seal material has a tendency to climb the edge of the barrier layer 308 and release film 320. FIG. 5 illustrates the edge seal 516 material climbing the edge of the barrier layer 308. Removing the release film 318 after creating the edge seal 516 can leave behind an edge burr 505. For example, the edge burr 504 may be of up to 65 microns in height around the outer edge (not drawn to scale). This edge burr 505 can interfere with the lamination of additional materials to the top of the display, since the top surface is no longer flat and planar. In order to prevent or reduce the creation of the edge burr 505, the embodiments described herein can extend the release film beyond the edges of the barrier layer 308 by some distance, such as illustrated in FIG. 6.

Figure 6:
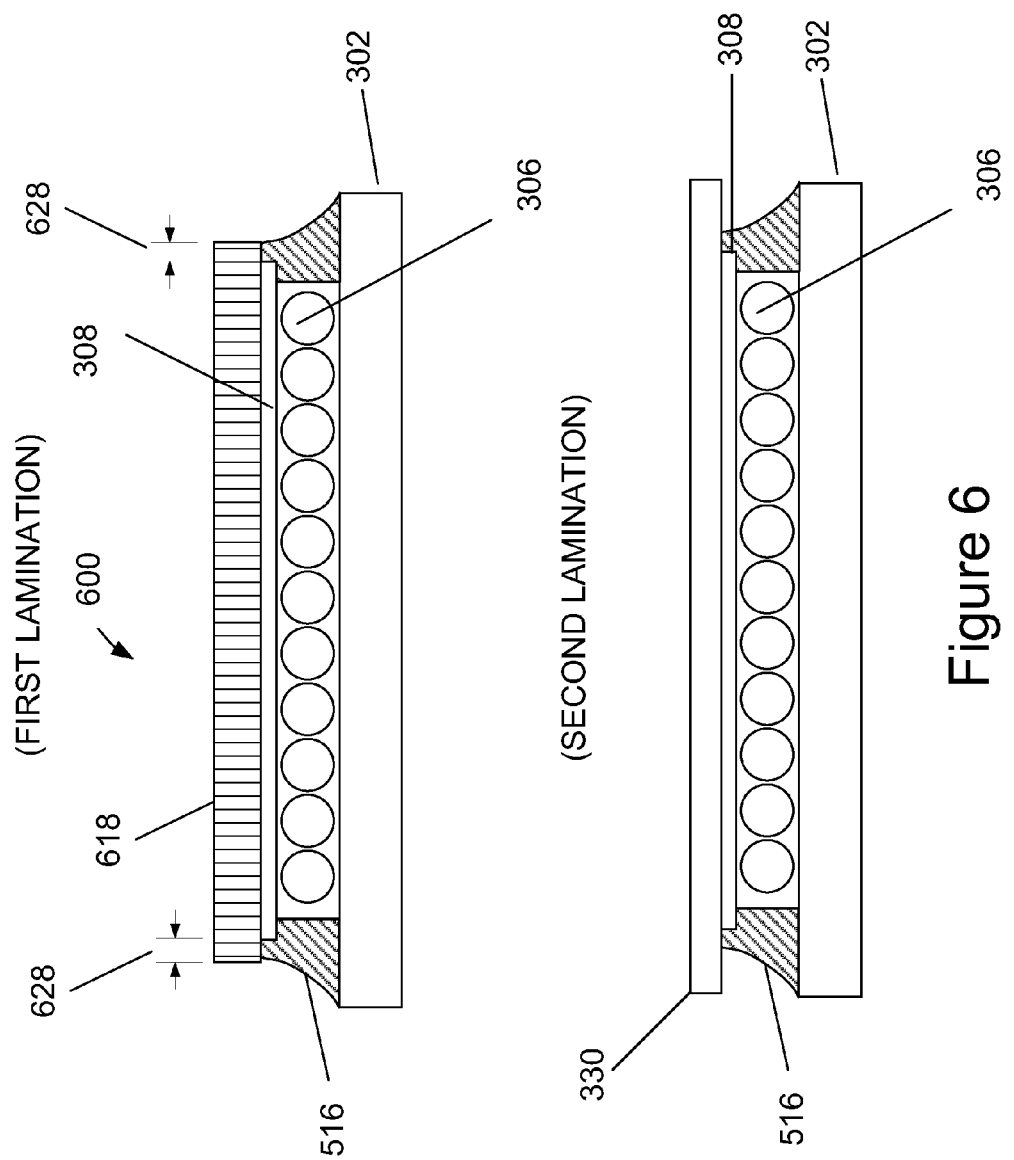
FIG. 6 illustrates a first and a second lamination of an electro-optic display with a barrier layer and a release film that extends beyond the barrier layer according to one embodiment.

FIG. 6 illustrates a first and a second lamination of an electro-optic display 600 with a barrier layer 308 and a release film 618 that extends beyond the barrier layer 308 according to one embodiment. The electro-optic display 600 is similar to the electro-optic display 300 as noted by similar reference numbers, except the release film 618 extends beyond the barrier layer 308 by a distance 628. By extending the release film 618 by the distance 628, the edge seal 516 may climb the edge of the barrier layer 308, but does not does not climb the edge of the release film 618. This prevents edge burrs 505 (illustrated in FIG. 5) from occurring during creation of the edge seal 516. In one embodiment, the distance 628 may be 0.5 mm to 1.0 mm beyond the barrier layer 308. Alternatively, other dimensions may be used as would be appreciated by one of ordinary skill in the art having the benefit of this disclosure.

When the edge sealant 516 is applied, it will be constrained by the overhanging release film 618 so that it does not extend beyond the front surface of the barrier layer 308. This leaves a substantially planar surface when the release film 618 is removed. After the release film 618 is removed, the front-surface layer 330 may be disposed above the substantially plurality planer surface of the barrier layer 308. As described herein, the barrier layer 308 may be prepared with or without adhesive as described herein.

Figure 7:
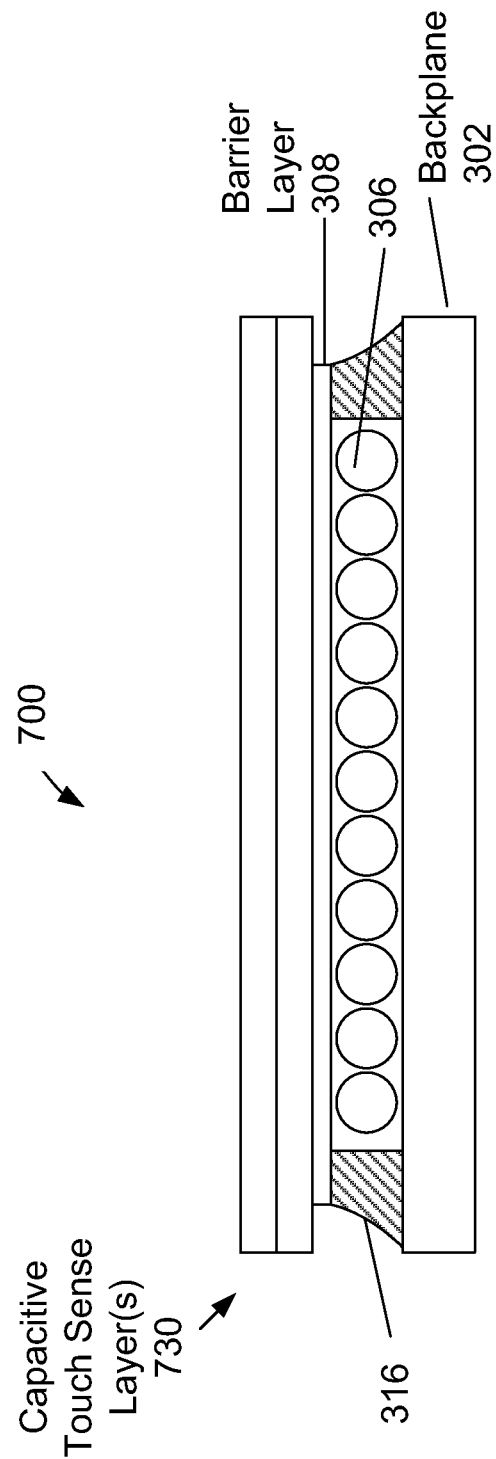
FIG. 7 illustrate one embodiment of an electro-optic display with a capacitive touch sensor disposed in the front-surface material.

In yet another embodiment, the front-surface material that is laminated on top of the barrier layer 308 may include a capacitive touch sensor, such as illustrated in FIG. 7. The capacitive touch sensor may be constructed either on a glass or polymer substrate. Alternatively, other substrates may be used.

FIG. 7 illustrate one embodiment of an electro-optic display 700 with a capacitive touch sensor disposed in the front-surface material. Instead of disposing a front-surface glass above the barrier layer 308, in this embodiment, one or more capacitive touch sense layers 730 are disposed above the barrier layer 308. The capacitive touch sense layers 730 may include a substrate, one or more conductive layers, such as traces disposed above one or more sides of the substrate, and an overlay (e.g., glass overlay). The actual construction of the capacitive touch sensor can vary as would be appreciated by one of ordinary skill in the art having the benefit of this disclosure. The capacitive touch sense layers 730 may be disposed directly on the barrier layer 308 or may have intervening layers, such as an adhesive layer between the bottom layer of the layers 730 and the barrier layer 308 as described herein. The overall thickness of the electro-optic display 700 may be less than conventional displays that also include a capacitive touch sensor disposed above an electro-optic display for the same reasons as described above with respect to FIG. 3.

In another embodiment, the front-surface material that is laminated on top of the barrier layer 308 is a light guide plate capable of directing an array of LED's mounted at one side to uniformly illuminate the display surface. Alternatively, other front-surface materials may be laminated on top of the barrier layer 308 as would be appreciated by one of ordinary skill in the art having the benefit of this disclosure.

Figure 8:
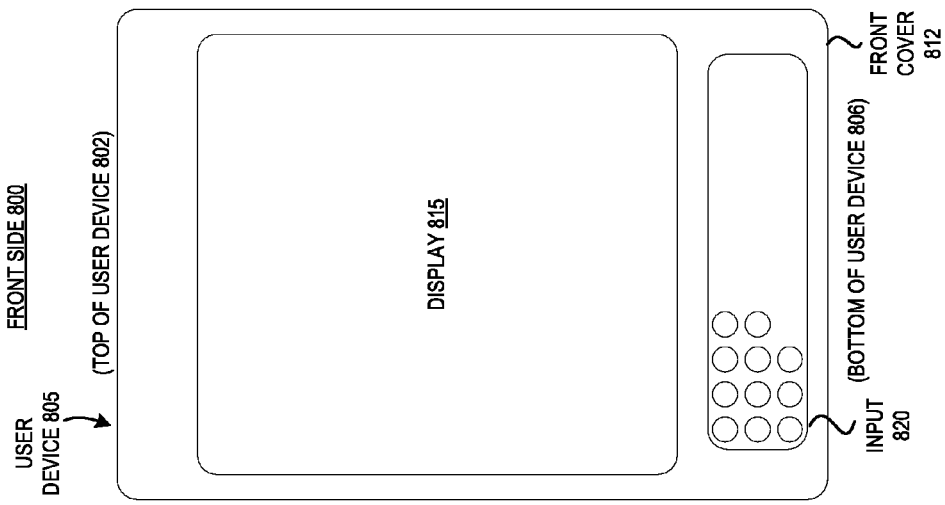
FIG. 8 illustrates an example of a front side of a user device with a conventional display.

FIG. 8 illustrates an example of a front side of a user device with a conventional display. The front side 800 includes a display 815 and optionally an input 820 housed in a front cover 812. The display 815 may use any conventional EPD display technology as described herein, such as electronic ink (e-ink) or other electro-optic mediums. The input 820 may include a keyboard, touch pad, or other input mechanism. In one embodiment, the display 415 and input 420 are combined into one or more touch screens. Because the conventional EPD display uses the top-hat protective layer 218, the top-hat protective layer 218 is smaller in width than the backplane 208 (illustrated in FIG. 2). The display 815 thus cannot extend to the edges of the user device 815 and the front cover 812 is used to cover the distance between the display 815 and the edges of the user device 805. The user device 805 does not have a seamless front surface.

Figure 9:
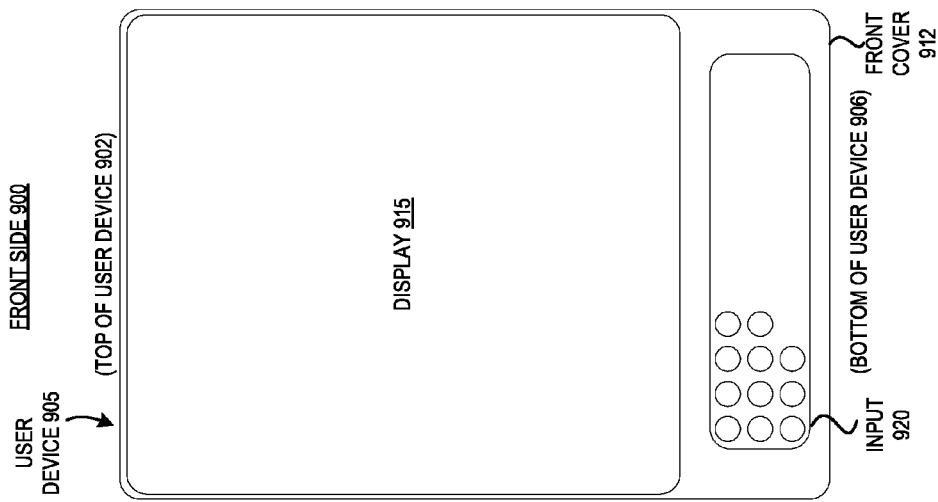
FIG. 9 illustrates one embodiment of a front side of a user device with an electro-optic display with a seamless front surface.

FIG. 9 illustrates one embodiment of a front side 900 of a user device 905 with an electro-optic display 915 with a seamless front surface. The front side 900 includes a display 915 and optionally an input 920 housed in a front cover 912. The display 915 may use any of the embodiments described herein that includes a front-surface layer (e.g., 330) that can extend to the edge of the backplane an even beyond. The display 915 can extend to the edges of the user device 915, and thus, may not need a front cover. A front cover may still be used, but can be smaller than the front cover 812 as would be appreciated by one of ordinary skill in the art having the benefit of this disclosure. For example, as illustrated in FIG. 9, a front cover may be used to house the input 920. The user device 905 has a seamless front surface. The display 915 may also include other materials in the display, such as liquid crystal displays (LCDs), transflective LCDs, light emitting diodes (LEDs), laser phosphor displays (LSP), and so forth. The input 920 may include a keyboard, touch pad, or other input mechanism. In one embodiment, the display 915 and input 920 are combined into one or more touch screens.

The user device 905 may be similar to user device 805, except user device 905 has a seamless front surface. The display 915 extends to the top of the user device 902 and two sides of the user device 905, whereas the display 815 does not extend to the top of the user device 802 or to the sides. The display 915 may be any one of the electro-optic displays 300, 400, 600, and 700, described above with respect to FIGS. 3-7.

Figure 10:
FIG. 10 illustrates another embodiment of a front side of a user device with an electro-optic display with a seamless front surface.

FIG. 10 illustrates another embodiment of a front side 1000 of a user device 1005 with an electro-optic display with a seamless front surface. The front side 1000 includes a display 1015 in a front cover 1012. The display 1015 may be any one of the electro-optic displays 300, 400, 600, and 700, described above with respect to FIGS. 3-7. In this embodiment, the display 1015 extends to all sides of the user device 1005, creating a seamless front surface. In this embodiment, there is no front cover, but rather an edge 1012, such as a bevel on the side of the device. Alternatively, the display 1015 may be disposed in other configurations with or without additional inputs, such as keyboards, buttons, etc. It should be noted that the sizes, shapes, thicknesses and other dimensions of the structures illustrated in the Figures are for illustrative purposes and are not meant to be to scale as would be appreciated by one of ordinary skill in the art having the benefit of this disclosure.

Figure 11:
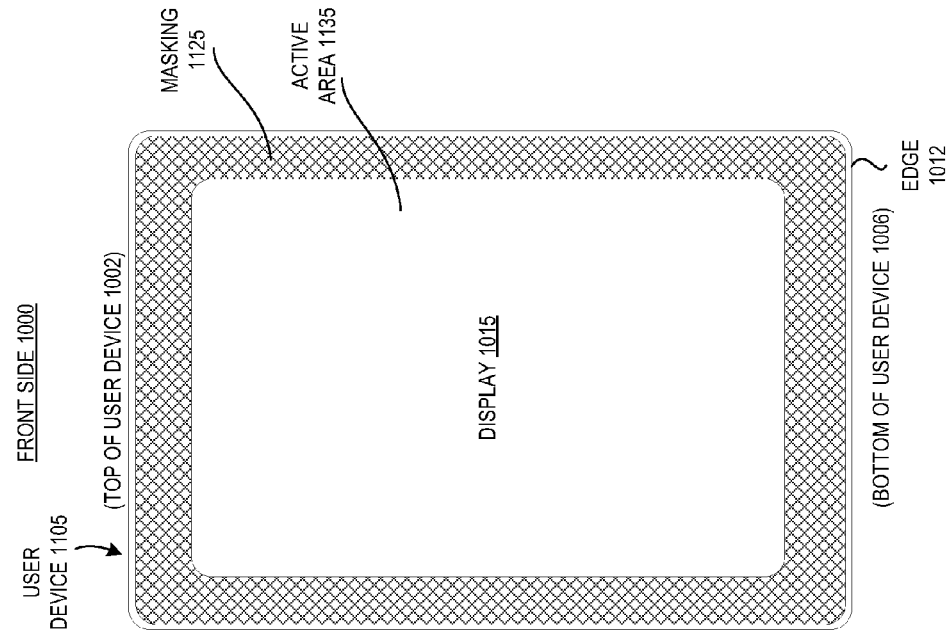
FIG. 11 illustrates another embodiment of a front side of a user device with an electro-optic display with masking on a seamless front surface.

FIG. 11 illustrates another embodiment of a front side 1000 of a user device 1105 with an electro-optic display with masking 1125 on a seamless front surface. The front side 1000 includes a display 1015 in a front cover 1012. The front surface material can be screen printed with a black border for masking 1125 (illustrated by the hashed border around the display 1015) to mask an active area 1135. In one embodiment, the masking 1125 is screen printed black. In another embodiment, the masking 1125 is screen printed with other colors, or even graphics as would be appreciated by one of ordinary skill in the art having the benefit of this disclosure. The display 1015 may be any one of the electro-optic displays 300, 400, 600, and 700, described above with respect to FIGS. 3-7. In this embodiment, the display 1015 extends to all sides of the user device 1005, creating a seamless front surface, but the masking 1125 masks the display 1015 to the active area 1135.

FIG. 12 illustrates an elevation view of the user device 1105 of FIG. 11. The user device 1105 includes an electro-optic display 1200 that is similar to the electro-optic display 400 as noted by similar reference numbers, except the front-surface layer 430 has masking 1125 at the edges. The masking 1125 masks the active area 1135 as described above. Although the width of the front-surface layer 430 is greater than the width of the backplane 302, the masking 1125 can mask an active area 1135 that is smaller in dimensions than the backplane 302. The user device 1105, like the user device 1005 has a seamless front surface.

Figure 13:
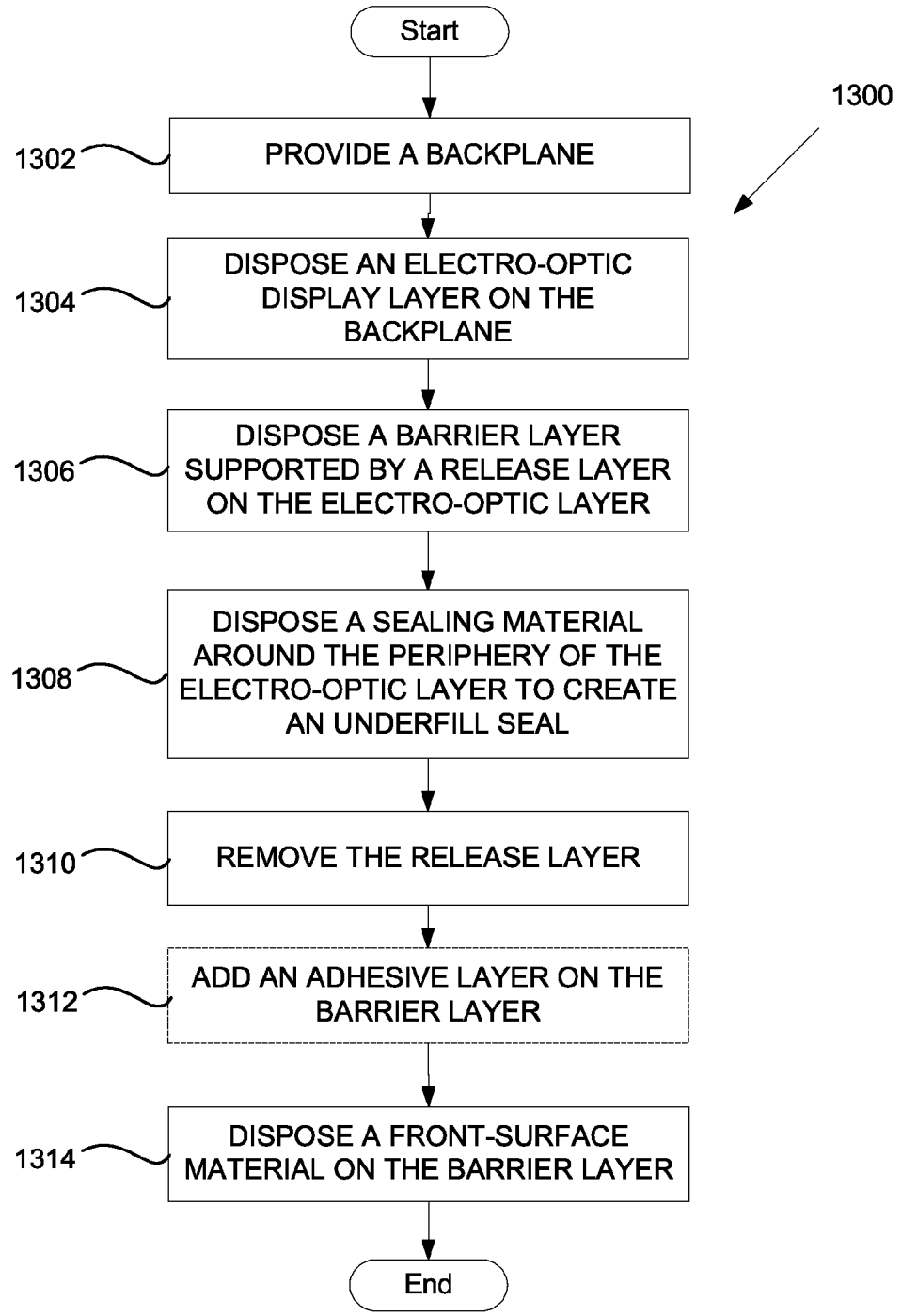
FIG. 13 is a flow diagram of an embodiment of a method of manufacturing for producing an electro-optic display with a barrier layer for a seamless front surface of a user device.

FIG. 13 is a flow diagram of an embodiment of a method of manufacturing 1300 for producing an electro-optic display with a barrier layer for a seamless front surface of a user device. First, a backplane is provided (block 1302). Next, an electro-optic display layer is disposed above the backplane (block 1304). It should be noted that the electro-optic display layer may include one or more layers, such as described above with respect to the FPL 306 of FIG. 3. A barrier layer supported by a release layer is disposed above the electro-optic layer (block 1306). The edge seal is then creating by disposing sealing material around the periphery of the electro-optic display layer and under the barrier layer and supporting release film (block 1308). The release layer is then removed (block 131). In one embodiment, the barrier layer 308 is pre-manufactured to have an adhesive layer on the top surface so when the release film is removed, the barrier layer 308 already has an adhesive layer. In another embodiment, as illustrate in FIG. 13, an adhesive layer is added on the barrier layer (block 1312). Regardless of how the adhesive layer is added or pre-existing, a front-surface material is disposed above the barrier layer (block 1314), and the method of manufacturing 1300 ends.

Figure 14:
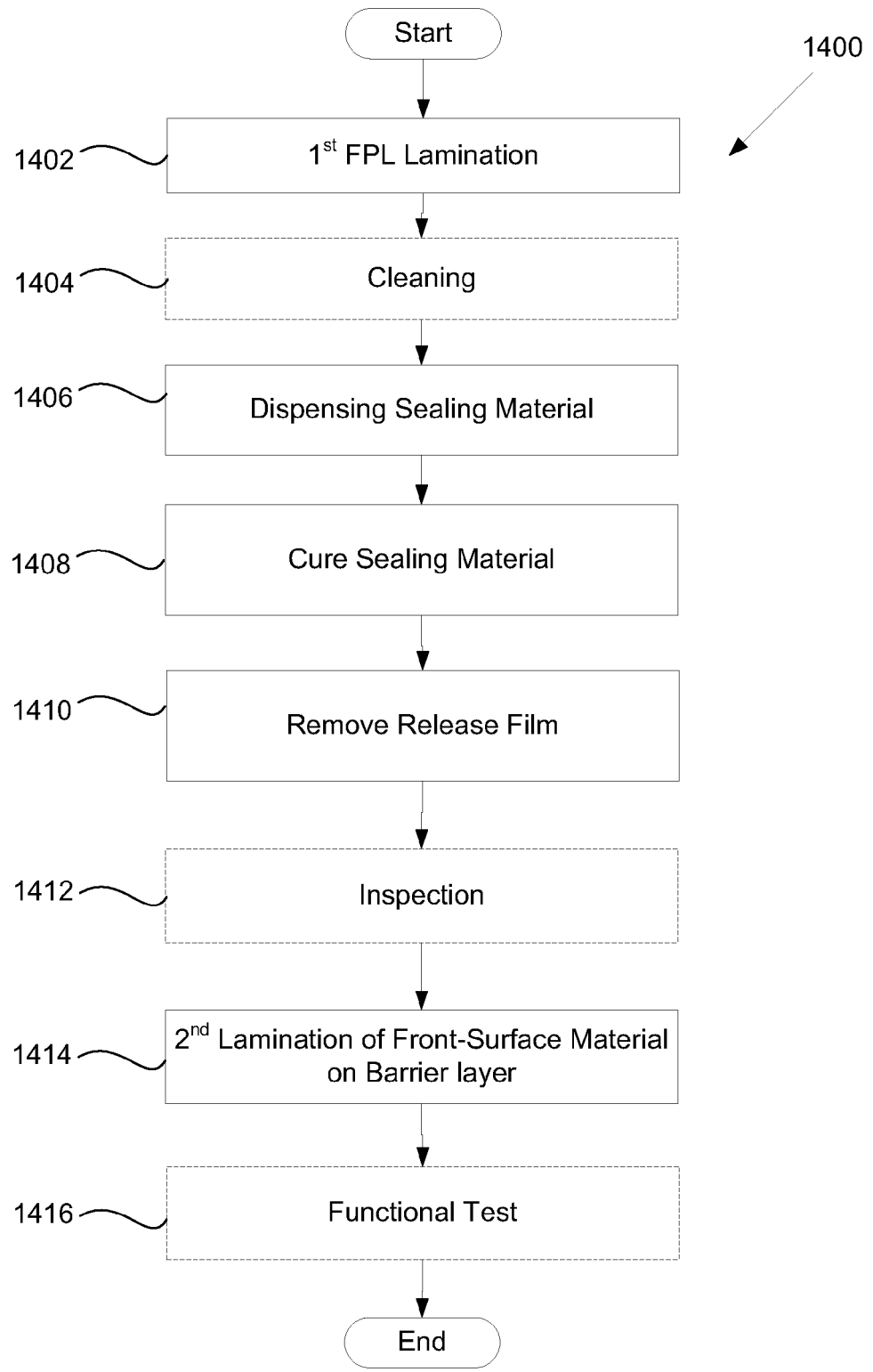
FIG. 14 is a flow diagram of an embodiment of a method of manufacturing for producing an edge seal on an electro-optic display with a barrier layer and a front-surface material.

FIG. 14 is a flow diagram of an embodiment of a method 1400 of manufacturing for producing an edge seal on an electro-optic display with a barrier layer and a front-surface material. The method of manufacturing 1400 begins with a first FPL lamination (block 1402). At block 1402, the method of manufacturing may include providing a backplane having at least one electrode, and disposing the electro-optic layer(s) of the FPL (such as described above with respect to FPL 306 of FIG. 3). Above the FPL is disposed a barrier layer along with a release film. The release film is provided to support the barrier layer 308 during the first lamination as shown in FIG. 3. After performing the first FPL lamination, the display may be optionally cleaned (block 1404) to prepare the display for the sealing material. At block 1406, sealing material is dispensed around the peripheral portion of the backplane. Dispensing of the sealing material creates an underfill edge seal between the backplane and the barrier layer (as shown in FIG. 3) or between the backplane and the barrier layer and the release film (as shown in FIG. 6). In one embodiment, the sealing material is ECCOSEAL™ 7100™ or 7200™ display sealants. Alternatively, other sealing material may be used. In one embodiment of the method of manufacturing 1400, a capillary flow underfill process may be used in which a liquid form of the sealing material is dispensed. In one embodiment, the sealing material is dispensed at block 1406 using a syringe that can fit between the distance between the end of the barrier layer and the backplane, or that can fit between the distance between the end of the release film and the backplane. When a predetermined amount of sealing material is dispensed along one or more peripheral sides of the backplane 302, the sealing material is drawn inward by capillary action occurring in the gap between the barrier layer 308, layer 306, and the backplane 302, as shown in FIG. 3 In another embodiment, as shown in FIG. 6, the sealing material is drawn inward by capillary action occurring in the gap between the release film 320, the barrier layer 308, layer 306, and the backplane 302

After dispensing the underfill material at block 1406, the underfill material is cured (block 1408) and the release film can be removed (block 1410). The display can then be optionally inspected (block 1410) before a second lamination. During the second lamination, a front-surface material is laminated to the barrier layer (block 1414). In one embodiment, the barrier layer has a substantially optically clear adhesive pre-applied to the surface to be laminated with the front-surface material. In another embodiment, after removing the release film at block 1410, a layer of adhesive can be disposed above the surface of the barrier layer for laminating the front-surface material to the backplane. After the second lamination, the display can optionally be functionally tested (block 1416), and the method of manufacturing 1400 ends.

For the purpose of subsequent discussion, the term "backplane" is used herein consistent with its conventional meaning in the art of electro-optic displays, to mean a rigid or flexible material provided with one or more electrodes. The backplane may also be provided with electronics for addressing the display, or such electronics may be provided in a unit separate from the backplane. In flexible displays, it is highly desirable that the backplane provide sufficient barrier properties to prevent ingress of moisture and other contaminants through the non-viewing side of the display (the display is of course normally viewed from the side remote from the backplane). If one or more additional barrier layers need to be added to the backplane to reduce ingress of moisture and other contaminants, the barrier layers should be located as closely as possible to the electro-optic layer so that little or no edge profile of low barrier material is present between the front (discussed below) and rear barrier layers.

The term "front substrate" (also referred to "front-surface substrate" or "front-surface layer") is used herein consistent with its conventional meaning in the art of electro-optic displays s, to mean a rigid or flexible material that is light-transmissive (and preferably transparent). The front substrate will typically comprise at least one electrode, most commonly a single continuous front electrode extending across the entire display, although as already mentioned certain displays which are written with a stylus of similar writing implement separate from the display itself do not require a front electrode. Typically, the exposed surface of the front substrate will form the viewing surface through which an observer views the display, although, as in some of the preferred embodiments described below, there may be additional layers interposed between the front substrate and the viewing surface. As with the backplane, the front substrate needs to provide sufficient barrier properties to prevent ingress of moisture and other contaminants through the viewing side of the display. If one or more additional layers need to be added to the front substrate to reduce ingress of moisture and other contaminants, the barrier layers should be located as closely as possible to the electro-optic layer so that little or no edge profile of low barrier material is present between the front and rear barrier layers.

Where an adhesive layer is required to attach the front substrate, the adhesive layer should be transparent, colorless, thin, flexible, have low creep (when the display is flexed or rolled), and be durable at all temperatures within the operating range of the display. Certain cross-linked polyurethanes and polyacrylates can be used as such adhesives, and in general, the adhesives can be applied in liquid of sheet form.

The terms "above," "under," and "between" as used herein refer to a relative position of one media layer with respect to other layers. As such, for example, one layer disposed above or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Additionally, the relative position of one layer with respect to other layers is provided assuming operations are performed relative to a substrate without consideration of the absolute orientation of the substrate.

Figure 15:
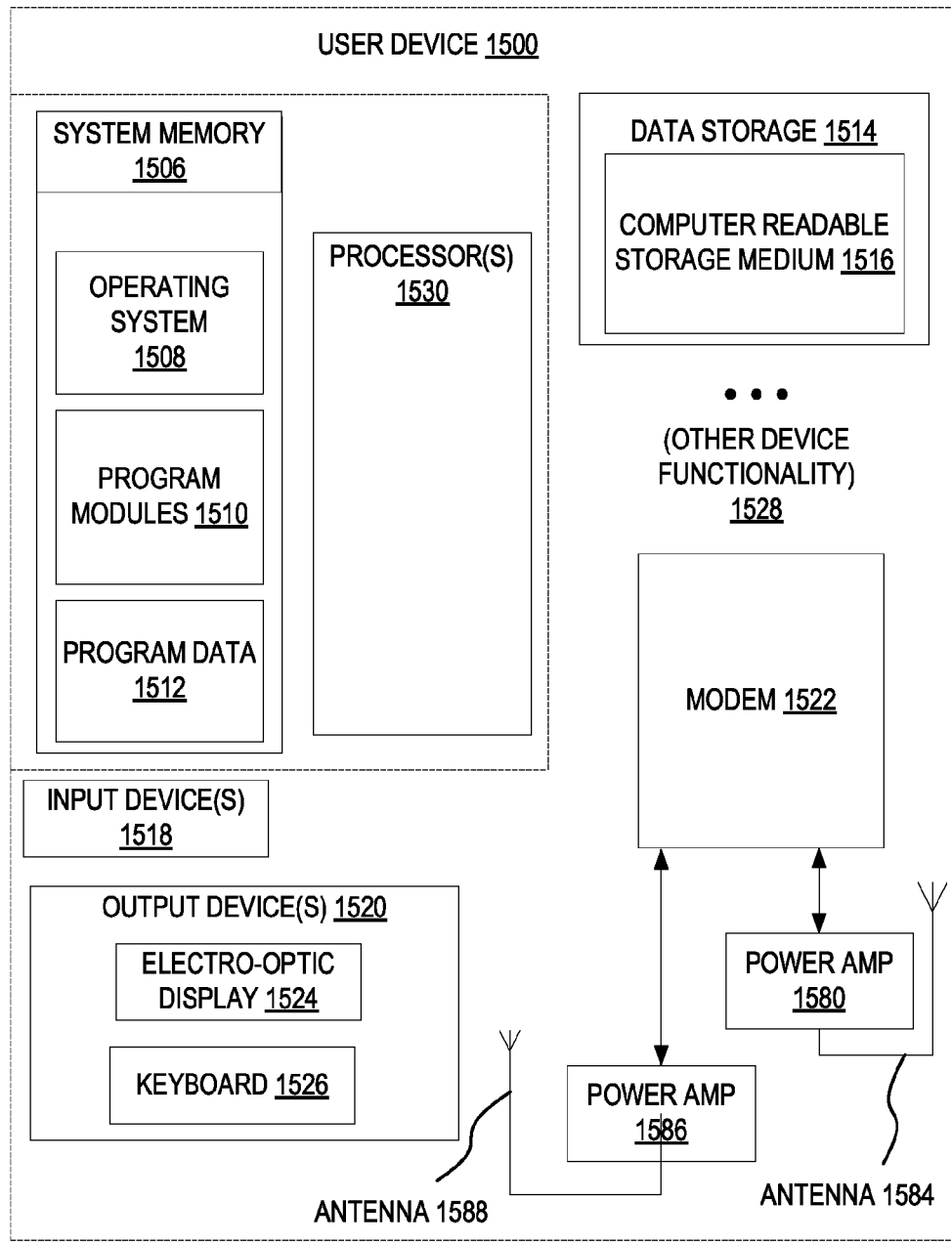
FIG. 15 is a block diagram illustrating one embodiment of an exemplary user device.

FIG. 15 is a block diagram illustrating an exemplary user device 1500. The user device 1500 may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like.

The user device 1500 includes one or more processors 1530, such as one or more CPUs, microcontrollers, field programmable gate arrays, or other types of processors. The user device 1500 also includes system memory 1506, which may correspond to any combination of volatile and/or non-volatile storage mechanisms. The system memory 1506 stores information which provides an operating system component 1508, various program modules 1510 such as program data 1512, and/or other components. The user device 1500 performs functions by using the processor(s) 1530 to execute instructions provided by the system memory 1506.

The user device 1500 also includes a data storage device 1514 that may be composed of one or more types of removable storage and/or one or more types of non-removable storage. The data storage device 1514 includes a computer-readable storage medium 1516 on which is stored one or more sets of instructions embodying any one or more of the methodologies or functions described herein. As shown, instructions for various program modules 1510 may reside, completely or at least partially, within the computer readable storage medium 1516, system memory 1506 and/or within the processor(s) 1530 during execution thereof by the user device 1500, the system memory 1506 and the processor(s) 1530 also constituting computer-readable media. The user device 1500 may also include one or more input devices 1518 (keyboard, mouse device, specialized selection keys, etc.) and one or more output devices 1520, including for example, the electro-optic display 1524, which may be one of the electro-optic displays described above, speakers 1526, other visual output devices, printers, audio output mechanisms, and the like.

The user device 1500 further includes a wireless modem 1522 to allow the user device 1500 to communicate via a wireless network (e.g., such as provided by the wireless communication system) with other computing devices, such as remote computers, the item providing system, and so forth. The wireless modem 1522 allows the user device 1500 to handle both voice and non-voice communications (such as communications for text messages, multimedia messages, media downloads, web browsing, etc.) with the wireless communication system 110. The wireless modem 1522 may provide network connectivity using any type of mobile network technology including, for example, cellular digital packet data (CDPD), GPRS, EDGE, universal mobile telecommunications system (UMTS), 1 times radio transmission technology (1xRTT), evaluation data optimized (EVDO), high-speed down-link packet access (HSDPA), WiFi, Long Term Evolution (LTE) and LTE Advanced (sometimes generally referred to as 4G), etc. It should be noted that the modem 1522 may include a processing component that performs various operations to handle both voice and non-voice communications.

The wireless modem 1522 may generate signals and send these signals to power amplifier (amp) 1580 or power amp 1586 for amplification, after which they are wirelessly transmitted via antenna 1584 or antenna 1588, respectively. Antenna 1584 and 1588 may be configured to transmit in different frequency bands and/or using different wireless communication protocols. The antennas 1584, 1588 may be directional, omnidirectional or non-directional antennas. In addition to sending data, antennas 1584, 1588 also receive data, which is sent to wireless modem 1522 and transferred to processor(s) 1530.

Though a single modem 1522 is shown to control transmission to both antennas 1584 and 1588, the user device 1500 may alternatively include multiple wireless modems, each of which is configured to transmit data via a different antenna and/or wireless transmission protocol. In addition, the user device 1500, while illustrated with two antennas 1584, 1588, may include more or fewer antennas in various embodiments.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required process steps. The required structure for a variety of these systems will appear from the description below. In addition, the present invention is not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present invention should, therefore, be determined with reference to the appended claims, along with the full scope of equivalents to which such claims are entitled.

What is claimed is:

1. An electro-optic display comprising:
   a backplane comprising at least one electrode;
   a first layer of lamination adhesive disposed above the backplane;
   a layer of electro-optic material disposed above the first layer of lamination adhesive;

a second layer of lamination adhesive disposed above the layer of electro-optic material;

a barrier layer disposed above the second layer of lamination adhesive;

an underfill edge seal created by a sealing material disposed to extend from peripheral portions of the backplane to the barrier layer;

a third layer of adhesive disposed above the barrier layer; and a front-surface material disposed above the third layer of adhesive, wherein a length and a width of the front-surface material are, respectively, equal to or greater than a length and a width of the backplane, wherein a length and a width of the barrier layer are, respectively, greater than a length and a width of the layer of electro-optic material and are, respectively, less than the length and the width of the backplane, and wherein the length and the width of the barrier layer are, respectively, less than the length and the width of the backplane.

2. The electro-optic display of claim 1, wherein the third layer of adhesive is disposed above the barrier layer after a release film is removed.

3. The electro-optic display of claim 2, wherein a length and a width of the release film are, respectively, greater than the length and the width of the barrier layer.

4. The electro-optic display of claim 1, wherein the third layer of adhesive is a layer of substantially optically clear adhesive between the barrier layer and the front-surface material.

5. The electro-optic display of claim 1, wherein the front-surface material is glass.

6. The electro-optic display of claim 5, wherein the glass comprises a masking to mask an area of the layer of electro-optic material.

7. The electro-optic display of claim 1, wherein the front-surface material comprises one or more layers of a capacitive touch sensor.

8. The electro-optic display of claim 1, wherein the layer of electro-optic material comprises an electrophoretic material comprising a plurality of electrically charged particles disposed in a fluid.

9. The electro-optic display of claim 8, wherein the electrically charged particles and the fluid are confined within a plurality of capsules or microcells.

10. The electro-optic display of claim 8, wherein the electrically charged particles and the fluid are present as a plurality of discrete droplets surrounded by a continuous phase comprising a polymeric material.

11. The electro-optic display of claim 8, wherein the fluid is gaseous.

12. The electro-optic display of claim 1, wherein the backplane comprises a thin-film transistor (TFT) disposed above a glass substrate.

13. The electro-optic display of claim 1, wherein the layer of electro-optic material comprises:
a Polyethylene terephthalate (PET) substrate;
a layer of indium tin oxide (ITO) disposed above the PET substrate; and
an electro-optic medium configured to operate in first and second display states differing in at least one optical property, the electro-optic medium is configured to change from its first to second display states by application of an electric filed to the electro-optic material.

14. A display comprising:
a backplane comprising at least one electrode;
an electro-optic display disposed above the backplane, wherein the electro-optic display is smaller in width and length than the backplane to leave a peripheral portion of the backplane extending beyond edges of the electro-optic display;
a barrier layer disposed above the electro-optic display, wherein barrier layer is greater in width and length than the electro-optic display to create an overhang under which sealing material can be disposed to create an underfill edge seal between the peripheral portion of the backplane and the overhang; and
a front-surface material disposed above the barrier layer, wherein the front-surface material is equal to or greater in width and length than the backplane.

15. The display of claim 14, wherein the electro-optic display comprises:
a first layer of lamination adhesive disposed above the backplane;
a layer of electro-optic material disposed above the first layer of lamination adhesive;
a second layer of lamination adhesive disposed above the layer of electro-optic material, wherein the first and second layers of lamination adhesive are to laminate the backplane and the layer of electro-optic material; and
a front substrate comprising at least one electrode disposed above the second layer of lamination adhesive, wherein the first and second layers of lamination adhesive are to laminate the backplane, the layer of electro-optic material and the front substrate.

16. The display of claim 15, wherein the layer of electro-optic material comprises an electrophoretic material comprising a plurality of electrically charged particles disposed in a fluid, and wherein the electrically charged particles and the fluid are confined within a plurality of capsules or microcells.

17. The display of claim 15, wherein the front substrate is Polyethylene terephthalate (PET) and the at least one electrode of the front substrate is a layer of indium tin oxide (ITO) disposed above or below the PET.

18. The display of claim 14, further comprising a layer of adhesive disposed above the barrier layer after a release film is removed.

19. The display of claim 18, wherein a length and a width of the release film are, respectively, greater than the length and the width of the barrier layer.

20. The display of claim 14, wherein the front-surface material is glass.

21. The display of claim 20, wherein the glass comprises a masking to mask an area of the electro-optic display.

22. A user device comprising:
a memory device;
an input device;
an electro-optic display; and
a processor coupled to the memory device, the input device, and the electro-optic display, wherein the processor is configured to present information in visual form to a user, wherein the electro-optic display comprises:
a backplane;
a layer of electro-optic material;
a barrier layer;
an edge seal between the barrier layer and the backplane; and
a front-surface material disposed above the barrier layer, the front-surface material to provide a seamless front surface of the electro-optic display, wherein a length and a width of the front-surface material are, respectively, equal to or greater than a length and a width of the backplane.

23. The user device of claim 22, wherein the layer of electro-optic material is configured to operate in first and second display states differing in at least one optical property, the electro-optic display is configured to change between its first to second display states by application of an electric filed to the layer of electro-optic material by the processor.

24. The user device of claim 22, further comprising:
a modem coupled to the processor; and
an antenna coupled to the modem.

25. A user device comprising:
a memory device;
an input device;
a processor coupled to the memory device and the input device, wherein the processor is configured to present information in visual form to a user; and
an electro-optic display structure coupled to the processor, wherein the electro-optic display comprises:
a backplane comprising at least one electrode;
an electro-optic display layer disposed above the backplane, wherein the electro-optic display layer is smaller in width and length than the backplane to leave a peripheral portion of the backplane extending beyond edges of the electro-optic display layer;
a barrier layer disposed above the electro-optic display layer, wherein barrier layer is greater in width and length than the electro-optic display layer to create an overhang under which sealing material can be disposed to create an underfill edge seal between the peripheral portion of the backplane and the overhang; and
a front-surface material disposed above the barrier layer, wherein the front-surface material is equal to or greater in width and length than the backplane.

26. The user device of claim 25, wherein the electro-optic display layer is configured to operate in first and second display states differing in at least one optical property, the electro-optic display layer is configured to change between its first to second display states by application of an electric filed to the electro-optic display layer by the processor.

27. The user device of claim 25, further comprising:
a modem coupled to the processor; and
an antenna coupled to the modem.

28. The user device of claim 25, wherein the electro-optic display structure comprises:
a first layer of lamination adhesive disposed above the backplane;
a layer of electro-optic material disposed above the first layer of lamination adhesive;
a second layer of lamination adhesive disposed above the layer of electro-optic material, wherein the first and second layers of lamination adhesive are to laminate the backplane and the layer of electro-optic material; and
a front substrate comprising at least one electrode disposed above the second layer of lamination adhesive, wherein the first and second layers of lamination adhesive are to laminate the backplane, the layer of electro-optic material and the front substrate.

29. The user device of claim 28, wherein the layer of electro-optic material comprises an electrophoretic material comprising a plurality of electrically charged particles disposed in a fluid, and wherein the electrically charged particles and the fluid are confined within a plurality of capsules or microcells.

30. The user device of claim 28, wherein the front substrate is Polyethylene terephthalate (PET) and the at least one electrode of the front substrate is a layer of indium tin oxide (ITO) disposed above or below the PET.

31. The user device of claim 25, further comprising a layer of adhesive disposed above the barrier layer after a release film is removed.

* * * * *